United States Patent Office 3,253,322
Patented May 31, 1966

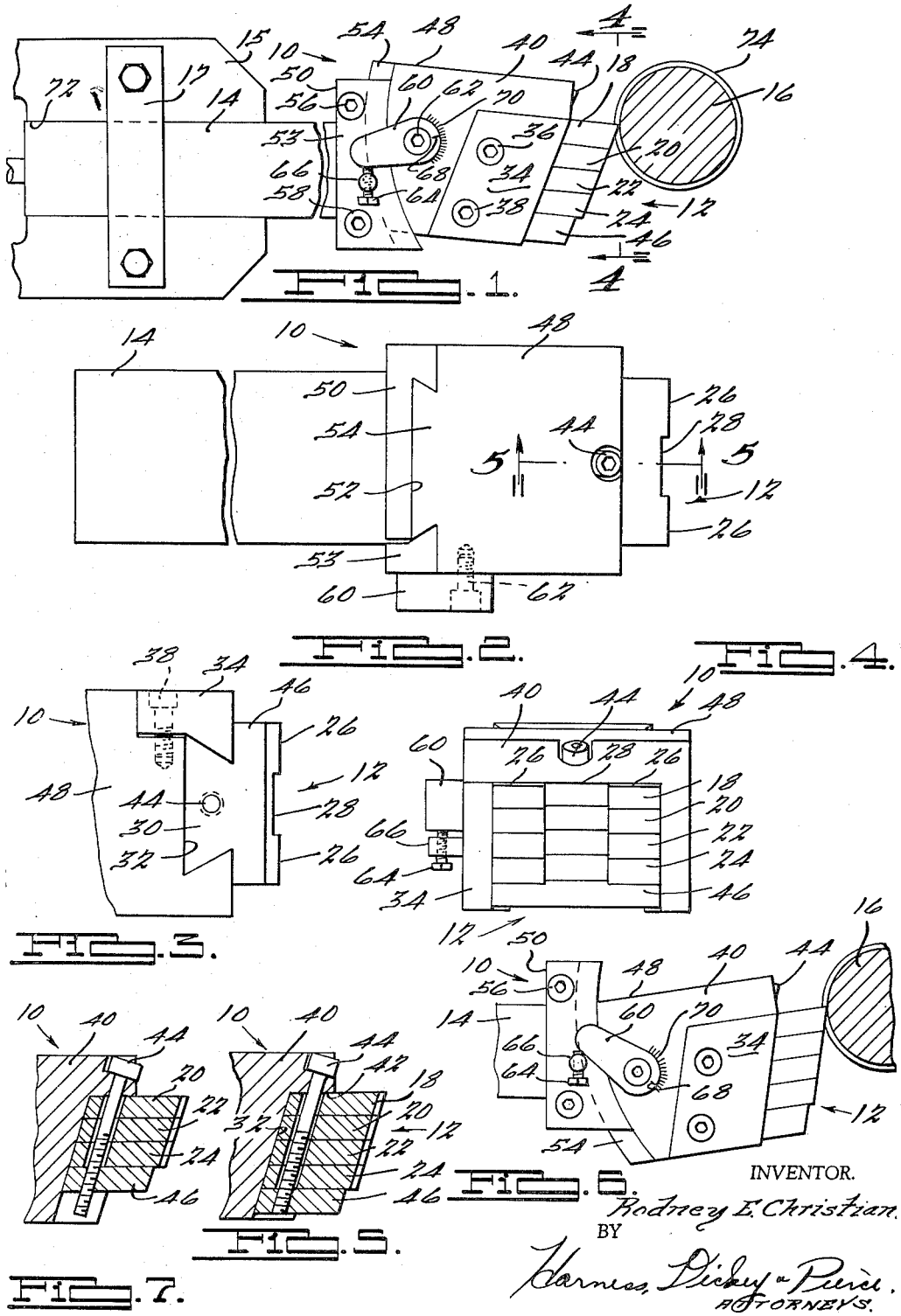

3,253,322
FORM TOOL
Rodney E. Christian, Bloomfield Township, Oakland County, Mich., assignor to Brown-McLaren Manufacturing Co., Hamburg, Mich., a corporation of Michigan
Continuation of application Ser. No. 726,113, Apr. 3, 1958. This application Nov. 15, 1963, Ser. No. 325,207
19 Claims. (Cl. 29—98)

This invention relates broadly to new and useful improvement in form tools and is a continuation of my copending application Serial No. 726,113, filed April 3, 1958, entitled "Form Tool."

More particularly, the invention is concerned with, though not necessarily limited to, form tools for multiple and single spindle machines such as screw machines, turret lathes, and the like.

Manufactures of screw machine products for example, frequently have to tool up for production of a relatively small number of parts. In these situations the cost of the tools is an important item in the total cost of the job, and therefore it is not practical to provide more than one cutting tool. As a result, the machine is idle when the tool is removed for sharpening and valuable production time is lost. The above notwithstanding, however, it is the usual practice for each machine operator to remove the tools for sharpening at the beginning of each shift. The operator himself usually sharpens the tool and while he is about it he may and often does change the rake angles in accordance with his own personal convictions even though this requires additional time and results in additional loss of production.

An important object of the present invention is to provide a tool having a novel multi-sectional cutting form tool that will decrease the idle time of the machine heretofore resulting from sharpening and regrinding of the tool under the conditions hereinabove described.

Another object of the invention is to provide a multi-sectional form tool that will cost little if any more than the conventional single tool heretofore used.

Still another object of the invention is to provide a cutting tool of the above mentioned character in which the individual sections thereof constitute cutting elements or bits having identical cutting edges and collectively forming a bit stack.

Yet another object of the invention is to provide a multisectional cutting tool of the above mentioned character wherein only one cutting element or bit is used at a time to cut the workpiece but wherein all of the bits mutually cooperate during the cutting operation to strengthen and reinforce the tool and wherein the cutting edges of the bits not in use are protected in use by the adjacent bits in the stack.

A further object of the invention is to provide a cutting tool of the above mentioned character wherein the bits are interchangeable so that each bit can be selectively positioned to bring its cutting edge into operative relation with the workpiece.

A still further object of the invention is to provide a tool holder wherein the rake angle of the form cutting tool can be adjusted without affecting the setup of the tool in the machine.

Other objects and advantages of the invention will be apparent during the course of the following description.

In the drawing forming a part of this specification and wherein like numerals are employed to designate like parts throughout the same, FIGURE 1 is a side elevational view illustrating a tool holder embodying the invention mounted on a machine and in operative association with a workpiece and showing the cutting tool with a negative rake angle;

FIG. 2 is a top plan view of the same;
FIG. 3 is a fragmentary bottom plan view thereof;
FIG. 4 is an end elevation of the cutting tool and tool holder looking in the direction of the arrows 4—4 in FIGURE 1;
FIG. 5 is a fragmentary longitudinal sectional view taken on the line 5—5 of FIG. 2;
FIG. 6 is a fragmentary side elevational view showing the tool holder with one of the cutting bits removed for sharpening, and
FIG. 7 is a fragmentary view similar to FIGURE 1 but showing a cutting tool having a positive rake angle.

In the drawing, wherein for the purpose of illustration is shown a preferred embodiment of the invention, the numeral 10 designates a tool holder which carries a cutter 12. A shank 14 on the holder 10 is adapted to fit into an actuating part of a machine, as for example the main cross slide 15 of a screw machine fragmentarily shown in FIGURE 1. The shank 14 preferably and usually is square in cross section and it is held in the mounting slot of the cross slide 15 by a clamping bar 17 according to conventional practice. When so mounted the cutting tool 12 is positioned for engagement with a workpiece 16 also in the machine.

According to the present invention, the cutter 12 comprises a stack of superimposed, individual cutter elements or bits which preferably are made of hardened tool steel. Four cutting bits 18, 20, 22 and 24 are here shown, but any desired number of bits can be used in the stack 12. It is possible in practically every instance to use a plurality of cutting bits which collectively are no larger than a cutter formed from a single block of steel according to conventional practice. When this condition obtains the initial cost of the multiple bit stack is no greater than the cost of a single conventional cutter as substantially the same amount of tool steel is used and all of the bits can be ground simultaneously to final shape.

All of the cutting bits 18–24 are of identical size and shape in plan, and they have identical flat beveled cutting sides arranged flush with each other. The bits 18–24 here shown have a generally straight cutting edge or profile 26 except for an inwardly offset middle portion 28. It will be readily appreciated however, that this particular shape is shown merely by way of example. In practice, the shape of the cutter varies depending upon the desired shape of the workpiece 16. The upper edge of the topmost bit 18 is the cutting edge of the tool 12, and in order to provide clearance between the tool and the work 16 the cutting faces of the bits are beveled or undercut, as shown in FIGS. 1 and 5. The cutter 12 can be provided with any desired clearance angle, but all of the bits should be ground with the same clearance angle so that all of the cutting sides are flush as shown in the drawing.

When the cutter 12 is formed of multiple cutting bits in the manner described, each bit strengthens and reinforces the other bits in the stack. Furthermore, the top edge of each bit is a cutting edge, but the cutting edge of each lower bit is protected while the cutter is in use by the bit immediately thereabove and by the flush arrangement of the cutting sides. In this manner, each bit can be made much thinner than would be possible if it were to be used as a single cutter without sacrificing the strength or efficiency of the cutter.

The rear sides or edges of the cutting bits preferably are formed parallel with the front or cutting edges thereof as shown to assure a flush arrangement of the cutting edges when the bits are stacked together as shown in the drawing. In this manner the bits are interchangeable in the stack, and any bit can be selectively positioned at the top of the stack with its cutting edge disposed for operative engagement with the workpiece 16. Also, any cutting bit can be removed from the stack for sharpening as shown in FIG. 7 for example. So long as the remaining bits collectively provide sufficient mass and strength to enable the cutter 12 to perform its intended operation, the removal of a bit for sharpening in no way affects the operativeness of the cutter. If three of the four bits shown provide the necessary strength for the cutting tool, it is immaterial if one of the bits is removed from the stack. A machine operator can, if he likes, simply move the top bit to a lower position in the stack when the cutting edge of the top bit becomes dull or he can remove the top bit entirely and send it to the tool room for sharpening. If the first alternative is followed, the dull bits can all be sharpened simultaneously at some convenient time, and if the latter alternative is followed, the newly sharpened bits can be kept in reserve at the machine and inserted in the stack at the convenience of the operator. In both instances the changing can be done in such a way as to minimize loss of production time due to tool changing.

The cutter 12 can be fastened to the holder 10 in any suitable way. However, it will be appreciated that the holding means should hold the bits 18, 20, 22 and 24 securely but at the same time permit them to be quickly individually removed or inserted. The cutter 12 here shown is formed at the rear side thereof with a dovetail 30 which fits into a dovetail slot 32 in the holder 10. A portion 34 of the holder forming one side of the dovetail slot 32 is made removable to release the cutter 12 but it is normally held in clamping engagement with the cutter by screws 36 and 38. When the screws 36 and 38 are tightened the cutter 12 is clamped solidly between the dovetail sides of the holder as shown in FIG. 3.

In order to hold the cutter 12 vertically positioned in the holder 10, the latter is formed with a forwardly projecting portion 40 which overlies the uppermost bit 18. The portion 40 is formed with a flat undersurface 42 and the topmost bit in the stack lays flatly against the surface. Also, the front face of the holder 10 under the projecting portion 40 is cut at the same bevel angle as the rear sides or edges of the cutting bits 18–24 so that the latter seat flatly thereagainst as shown in FIG. 5. A clamping screw 44 extends downwardly through the portion 40, through holes provided in the cutting bits, and threads into a lower clamping block 46. The forward edge of the clamping block conveniently can be set back from the cutting faces of the bits 18, 20, 22 and 24 and the rear portion thereof preferably is formed with the same dovetail shape as the cutter so that it is clamped to the holder together with the tool.

In practice, the cutting bits 18–24 and the clamping member 34 are assembled loosely in the holder 10 with the screws 36, 38 and 44 loose. The screw 44 is tightened to pull all of the bits together and to clamp the cutter 12 against the overhanging portion 40. Thereafter, the screws 36 and 38 are tightened to clamp the cutter 12 tightly against the backing surface 32 in the holder.

The multiple bit cutter hereinabove described can of course be used with a solid one-piece holder; however for increased efficiency in use it is preferred that the holder be made in two parts 48 and 50 which are angularly adjustable to vary the rake angle of the cutter 12. As shown in the drawing, the part 48 comprises a tool holding head which carriers the cutter 12 and the part 50 comprises a head mounting portion on the shank 14. A dovetail groove 52 in the front face of the head mounting portion 50 receives a dovetail 54 on the rear face of the head 48. The meeting faces of the head 48 and head mounting portion 50 including both the dovetail grooves 52 and the dovetail 54 extend generally parallel to the cutting edge of the cutter 12 and are arcuately curved on a radius extending from the cutting edge. As suggested, the cutting edge may have portions which are offset from each other and in this event the radius is struck from the outermost part of the edge.

Manifestly, movement of the tool holding head 48 in the dovetail groove 52 rocks the cutter 12 about its cutting edge to provide any desired rake angle for the cutter. If the top of the cutter 12 is below the horibontal a negative rake angle is provided, as shown in FIGURE 1, and if the top of the cutter is above the horizontal a positive rake angle is provided, as shown in FIG. 6. In order to facilitate angular adjustment of tool holding head 48 and to hold the same in a selected adjusted position, one side 53 of the dovetail groove 52 is formed seperately from the rest of the head mounting portion 50 and is detachably fastened thereto by screws 56 and 58. When the screws 56 and 58 are loose, tool holding head 48 can be easily adjusted angularly to vary the rake angle of the cutter 12, and when the screws 56 and 58 are tightened they clamp the tool holding head 48 solidly to hold the cutter in the selected adjusted position.

In order to expedite and facilitate adjustment of the cutter 12 to a desired rake angle, an arm 60 is fastened on one side of the tool holding head 48 by a screw 62. As shown in FIGURE 1, the arm 60 extends rearwardly to engage a setscrew 64 carried by a pin 66 in and projecting laterally from the head 48. A reference mark 68 on the arm 60 cooperates with a scale 70 calibrated in degrees on the head 48. When the screw 62 is loose, the arm 60 can be pivoted to position the reference mark 68 at any desired location on the scale 70, and the arrangement is such that when the head 48 is adjusted angularly to bring the arm 60 into engagement with the setscrew 64, the cutter 12 is positioned at the rake angle indicated on the scale 70. Manifestly, in order to achieve this end, it is necessary that the scale 70 be arranged to read "zero" when the top of the cutter 12 is horizontal and the setscrew 64 is positioned to engage the arm 60 when the reference mark 68 is at the "zero" position of the scale. The lines on the scale 70 below the "zero" position indicate degrees of positive rake, and the lines on the scale above the "zero" position indicate degrees of negative rake. The arm 60 thus provides a preset rake stop which enables the machine operator to set the cutter 12 easily and quickly to any desired rake position. By reason of the fact that the head 48 of the holder rotates or turns about the cutting edge of the cutter 12 as an axis, angular adjustment of the latter does not change the position of the cutting edge with respect to the workpiece 16. Thus the rake angle of the tool can be changed without removing the tool from the machine, and adjustment of the tool to change the rake angle does not require additional or secondary changes of the cutter or its holder in order to reposition the cutter properly for engagement with the work 16.

It is important that every cutting tool be exactly "on center" with respect to the workpiece 16 and it is customary for the tool setup man or machine operator to spend considerable time in getting the cutting edge of the tool properly aligned with the axis of the workpiece. As a practical matter this frequently is a difficult thing to do and the operator usually proceeds by trial and error. In a screw machine, for example, the upper side or surface 72 of the slot which receives the shank 14 of the holder 10 is lined up with the turning axis of the work 16, and the conventional tool holder is made with a flat top surface which extends flush with the top of the shank so that the setup man can "center" the tool by laying a straight edge on the top of the holder and then adjusting the tool until its edge just touches the straight edge. However, as a practical matter, the operator seldom if ever is able to center the tool exactly on the first try. The usual practice is to set the tool and then take a trial cut on a workpiece. A turning tool, for example, will leave an uncut portion at the center of the work of a diameter directly proportional to the amount the tool is off center. In the case of a cutoff tool there will be a little projection or teat at the center of the workpiece according to the amount the tool is off center. The operator observes the results of the trial cut and then adjusts the tool in accordance with the results observed. Sometimes he never does get the tool exactly on center. This type of hit-and-miss operation is wasteful and time consuming and results in imperfect work.

In order to obviate the above disadvantages, the holder of this invention is made so that the under surface 42 of the overhanging portion 40 is aligned exactly with and parallel to the top of the shank 14 when the reference mark 68 is set at zero on the scale 70. Thus, when the cutter 12 is clamped in the holder in the manner hereinabove described, the cutting edge thereof will be exactly on the center of the work 16. Furthermore, the cutting edge will remain precisely "on center" in all angularly adjusted positions of the tool.

All tools here under consideration are designed by the tool maker to operate at a certain predetermined rake angle. However, this angle can be varied within limits without affecting the cutting efficiency of the tool to any significant degree. The present tool takes advantage of this fact to enable the operator to control the size of a larger diameter of the workpiece within relatively small limits by changing the rake angle of the tool. In this connection it will be observed that the recessed cutting edges of the tool (such as the edge 28, for example) which cut the relatively large diameter 74 of the work 16 rocks about the cutting edge 26 when the cutter 12 is adjusted angularly in the holder, and as it rocks its radial dimension with respect to the center of the workpiece varies. Thus a slight error in the size of the outer diameter of the work can be compensated by changing the rake angle of the cutter.

Another important advantage of the instant invention is that the tool can be adjusted or "preset" to the correct or optimum rake angle by the engineering department of the tool room and not left to the discretion of each machine operator who uses the tool, thus assuring uniformity of work and maximum efficiency in operation.

I claim:

1. A form tool having a tool holder, and a bit stack carried by and removably fastened to said holder, said bit stack comprising a stack of superimposed individual cutting bits of identical size and shape in plan and having corresponding cutting sides arranged flush with each other, the cutting sides of said bits having identical cutting edges and the cutting edge of the topmost bit only adapted to act on a workpiece at any one time, the lower bits in the stack supporting and reinforcing said topmost bit and the cutting edges of said lower bits being protected while the tool is in use by the adjacent bits and by the flush arrangement of said cutting sides, said bits being interchangeable in the stack whereby any of said bits can be selectively positioned at the top of the stack with its cutting edge disposed for operative engagement with the workpiece.

2. A form tool having a tool holder, a bit stack carried by said holder, and means detachably fastening said bit stack to the holder at a selected predetermined rake angle, said bit stack comprising a stack of at least two superimposed individual cutting bits of identical size and shape in plan and having corresponding cutting sides arranged flush with each other, the cutting sides of said bits having identical cutting edges and the cutting edge of the topmost bit only being adapted to act on a workpiece at any one time, each lower bit in the stack supporting and reinforcing the other bits of the tool and the cutting edge of each lower bit being protected while the tool is in use by the bit immediately thereabove and by the flush arrangement of said cutting sides, said bits being selectively individually removable from the stack and being interchangeable therein whereby any of said bits can be selectively positioned at the top of the stack with its cutting edge disposed for operative engagement with the workpiece.

3. A form tool having a tool holder, a bit stack carried by said holder, and means detachably fastening said bit stack to the holder at a selected predetermined rake angle, said bit stack comprising a stack of at least two superimposed individual cutting bits of identical size and shape in plan and having corresponding cutting sides arranged flush with each other, the cutting sides of said bits having identical cutting edges and the cutting edge of the topmost bit only being adapted to act on a workpiece at any one time, each lower bit in the stack supporting and reinforcing the other bits of the tool and the cutting edge of each lower bit being protected while the tool is in use by the bit immediately thereabove and by the flush arrangement of said cutting sides, said bits being selectively individually removable from the stack and being interchangeable therein whereby any of said bits can be selectively positioned at the top of the stack with its cutting edge disposed for operative engagement with the workpiece, said holder having a reference surface adapted to be positioned in a machine in line with the axis of the work in the machine, and said bit stack being mounted in the holder with the cutting edge of said topmost bit in line with said reference surface.

4. A form tool having a tool holder, a bit stack carried by and removably fastened to said holder, said bit stack comprising a stack of at least two superimposed individual cutting bits of identical size and shape in plan and having corresponding cutting sides arranged flush with each other, the cutting sides of said bits having identical cutting edges and the cutting edge of the topmost bit only adapted to act on a workpiece at any one time, each lower bit in the stack supporting and reinforcing the other bits and the cutting edge of each such lower bit being protected while the tool is in use by the bit immediately thereabove and by the flush arrangement of said cutting sides, said bits being selectively individually removable from the stack and being interchangeable therein whereby any of said bits can be selectively positioned at the top of the stack with its cutting edge disposed for operative engagement with the workpiece, and means for selectively positioning said bit stack on the holder at a predetermined rake angle and for holding said bit stack securely at the selected rake angle.

5. A form tool having a tool holder and a bit stack carried by and removably fastened to said holder, said bit stack comprising a stack of at least two superimposed individual cutting bits of identical size and shape in plan and having corresponding cutting sides arranged flush with each other, the cutting sides of said bits having identical cutting edges and the cutting edge of the topmost bit only adapted to act on a workpiece at any one time, each lower bit in the stack supporting and reinforcing each adjacent bit and the cutting edge of each such lower bit being protected while the tool is in use by the bit immediately thereabove and by the flush arrangement of said cutting sides, said bits being selectively and individually removable from the stack and also being interchangeable in the stack whereby any of said bits can be selectively positioned at the top of the stack with its cutting edge disposed for operative engagement with the workpiece, means associated with said holder overlying the topmost bit in said bit stack and having a locating surface engaged by said topmost bit to position and orient the bit stack on said holder with the cutting edge of said topmost bit precisely on the center of the workpiece.

6. A form tool having a tool holder, a bit stack carried by and removably fastened to said holder, said bit stack comprising a stack of at least two superimposed individual cutter bits of identical size and shape in plan and having corresponding outer cutting sides arranged flush with each other, the cutting sides of said bits having identical cutting edges and the cutting edge of the topmost bit only adapted to act on a workpiece at any one time, each lower bit in the stack supporting and reinforcing each adjacent bit and the cutting edge of each such lower bit being proteced while the tool is in use by the bit immediately thereabove and by the flush arrangement of said cutting sides, said bits being selectively and individually removable from the stack and also being interchanged in the stack whereby any of said bits can be selectively positioned at the top of the stack with its cutting edge disposed for operative engagement with the workpiece, means associated with said holder overlying the topmost bit in said bit stack and having a locating surface engaged by said topmost bit to position and orient the bit stack in said holder, and means associated with said holder providing a back up surface engaged by the inner sides or edges of said bits to hold the cutting sides thereof flush with each other and cooperative with said locating surface to determine the location of the cutting edge of said topmost bit.

7. A form tool having a tool holder, a bit stack carried by and removably fastened to said holder, said bit stack comprising a stack of at least two superimposed individual cutter bits of identical size and shape in plan and having corresponding outer cutting sides arranged flush with each other, the cutting sides of said bits having identical cutting edges and the cutting edge of the topmost bit only adapted to act on a workpiece at any one time, each lower bit in the stack supporting and reinforcing each adjacent bit and the cutting edge of each such lower bit being protected while the tool is in use by the bit immediately thereabove and by the flush arrangement of said cutting sides, said bits being selectively and individually removable from the stack and also being interchanged in the stack whereby any of said bits can be selectively positioned at the top of the stack with its cutting edge disposed for operative engagement with the workpiece, means associated with said holder overlying the topmost bit in said bit stack and having a locating surface engaged by said topmost bit to position and orient the bit stack in said holder, means associated with said holder providing a back up surface engaged by the inner sides or edges of said bits to hold the cutting sides thereof flush with each other and cooperative with said locating surface to determine the location of the cutting edge of said topmost bit, and means associated with said holder providing a reference surface adapted to be positioned on a machine in line with the axis of the work in the machine, said back up surface and said locating surface cooperating to position the cutting edge of said topmost bit in line with said reference surface.

8. A form tool having a tool holder, a bit stack carried by and removably fastened to said holder, said bit stack comprising a stack of at least two superimposed individual cutting bits of identical size and shape in plan and having corresponding cutting sides arranged flush with each other, the cutting sides of said bits having identical cutting edges and the cutting edge of the topmost bit only adapted to act on a workpiece at any one time, each lower bit in the stack supporting and reinforcing the bit immediately thereabove in the stack and the cutting edge of each such lower bit being protected while the tool is in use by the bit immediately thereabove and by the flush arrangement of said cutting sides, said bits being selectively and individually removable from the stack and also being interchangeable in the stack whereby any of said bits can be selectively positioned at the top of the stack with its cutting edge disposed for operative engagement with the workpiece, means associated with said holder overlying said topmost bit and providing a locating surface engaged by said topmost bit, and means for angularly adjusting said overlying means about an axis coincident with the cutting edge of said topmost bit to vary the rake angle of said bit stack.

9. A form tool having a tool holder, a bit stack carried by and removably fastened to said holder, said bit stack comprising a stack of at least two superimposed individual cutting bits of identical size and shape in plan and having corresponding cutting sides arranged flush with each other, the cutting sides of said bits having identical cutting edges and the cutting edge of the topmost bit only adapted to act on a workpiece at any one time, each lower bit in the stack supporting and reinforcing the bit immediately thereabove in the stack and the cutting edge of each such lower bit being protected while the tool is in use by the bit immediately thereabove and by the flush arrangement of said cutting sides, said bits being selectively and individually removable from the stack and also being interchangeable in the stack whereby any of said bits can be selectively positioned at the top of the stack with its cutting edge disposed for operative engagement with the workpiece, said holder being in two parts, one part comprising a tool carrying head, the other part comprising a head mounting portion and a shank portion adapted for attachment to the operating part of a machine with the top of the shank precisely on the center line of a workpiece in the machine, said tool carrying head being pivotally connected and angularly adjustable relative to said head mounting portion on a radius extending from the cutting edge of said topmost bit whereby to position said bit stack at a selected rake angle, and means for holding said bit stack precisely located longitudinally of the holder and with the cutting edge of said topmost bit aligned precisely with the top of said shank and on the center line of the workpiece in all angularly adjusted positions of said bit stack.

10. A form tool having a tool holder, a bit stack carried by and removably fastened to said holder, said bit stack comprising a stack of at least two superimposed individual cutting bits of identical size and shape in plan and having corresponding cutting sides arranged flush with each other, the cutting sides of said bits having identical cutting edges and the cutting edge of the topmost bit only adapted to act on a workpiece at any one time, each lower bit in the stack supporting and reinforcing the bit immediately thereabove in the stack and the cutting edge of each such lower bit being protected while the tool is in use by the bit immediately thereabove and by the flush arrangement of said cutting sides, said bits being selectively and individually removable from the stack and also being interchangeable in the stack whereby any of said bits can be selectively positioned at the top of the stack with its cutting edge disposed for operative engagement with the workpiece, said holder being in two parts, one part comprising a tool carrying head, the other part comprising a head mounting portion and a shank portion adapted for attachment to the operating part of a machine with the top of the shank precisely on the center line of a workpiece in the machine, said tool carrying head being pivotally connected and angularly adjustable relative to said head mounting portion on a radius extending from the cutting edge of said topmost bit whereby to position said bit stack at a selected rake angle, means for holding said bit stack precisely located longitudinally of the holder and with the cutting edge of said topmost bit aligned precisely with the top of said shank and on the center line of the workpiece in all angularly adjusted positions of said bit stack, means on said tool holder for visually indicating the rake angle of said bit stack, and means for holding said tool carrying head in different selected angularly adjusted positions.

11. A form tool having a tool holder, a bit stack carried by and removably fastened to said holder, said bit stack comprising a stack of at least two superimposed individual cutting bits of identical size and shape in plan and having corresponding cutting sides arranged flush with each other, the cutting sides of said bits having identical cutting edges and the cutting edge of the top most bit only adapted to act on a workpiece at any one time, each lower bit in the stack supporting and reinforcing the bit immediately thereabove in the stack and the cutting edge of each such lower bit being protected while the tool is in use by the bit immediately thereabove and by the flush arrangement of said cutting sides, said bits being selectively and individually removable from the stack and also being interchangeable in the stack whereby any of said bits can be selectively positioned at the top of the stack with its cutting edge disposed for operative engagement with the workpiece, said holder being in two parts, one part comprising a tool carrying head, the other part comprising a head mounting portion and a shank adapted for attachment to the operating part of a machine, said tool carrying head being angularly adjustable relative to said head mounting portion on a radius extending from the cutting edge of the topmost bit in said bit stack to vary the rake angle of said bit stack, scale and indicator means for visually designating the rake angle of said bit stack, and stop means on said tool carrying head and said head mounting portion mutually engageable to position said bit stack at the rake angle indicated by said scale and indicator means, at least one of said stop means being adjustable to vary said rake angle.

12. A form tool having a tool holder, a bit stack carried by and removably fastened to said holder, said bit stack comprising a stack of superimposed individual cutting bits of identical size and shape in plan and having corresponding cutting sides arranged flush with each other, the cutting sides of said bits having identical cutting edges and the cutting edge of the top most bit only adapted to act on a workpiece at any one time, each lower bit in the stack supporting and reinforcing the bit disposed above it and the cutting edge of each lower bit being protected while the tool is in use by the bit immediately thereabove and by the flush arrangement of said cutting sides, said bits being selectively individually removable from the stack and being interchangeable therein whereby any of said bits can be selectively positioned at the top of the stack with its cutting edge disposed for operative engagement with the workpiece, said holder being in two parts, one part comprising a head mounting portion and a shank, said shank being adapted for attachment to the operating part of a machine, said head mounting portion being provided with an arcuate seat having its radius extending from the cutting edge of the topmost bit of said bit stack, the other part comprising a tool holding head carrying and detachably fastened to said bit stack and having a seating part engaging and complementary to the arcuate seat of said head mounting portion, means associated with said tool holding head overlying and engaging said bit stack to position and orient the latter in said holder, said shank having a reference surface adapted to be positioned in a machine in line with the axis of the work in the machine, the topmost bit of said bit stack when in engagement with said overlying means being positioned with the cutting edge thereof in line with said reference surface, the arrangement being such that angular adjustment of said tool holding head on said arcuate seat varies the rake angle of said bit stack, and means for clamping the tool holding head securely in a selected angularly adjusted position to said head mounting portion.

13. A form tool having a tool holder, a bit stack comprising a stack of superimposed individual cutting bits of identical size and shape in plan and having corresponding cutting sides arranged flush with each other, the cutting sides of said bits having identical cutting edges and the cutting edge of the topmost bit only adapted to act on a workpice at any one time, each lower bit in the stack supporting and reinforcing the bit disposed above it and the cutting edge of each lower bit being protected while the tool is in use by the bit immediately thereabove and by the flush arrangement of said cutting sides, said bits being selectively individually removable from the stack and being interchangeable therein whereby any of said bits can be selectively positioned at the top of the stack with its cutting edge disposed for operative engagement with the workpiece, said holder comprising a tool holding head and a head mounting member, said tool holding head carrying said bit stack, said head mounting member being adapted for attachment to the operating part of a machine and provided with an arcuate seat having its radius extending from the cutting edge of the topmost bit of said bit stack, said tool holding head having a seating part engaging and complementary to the arcuate seat of said head mounting member, means associated with and carried by said tool holder overlying and engaged by the topmost bit of said bit stack to position and orient the latter in said holder, said head mounting member having a reference surface adapted to be positioned in a machine in line with the axis of the work in the machine, the topmost bit of said bit stack when butting said overlying means being positioned with the cutting edge thereof in line with said reference surface, the arrangement being such that angular adjustment of said tool holding head on said arcuate seat varies the rake angle of said bit stack, means for clamping said tool holding head securely to said head mounting member in a selected angularly adjusted position, means for visually designating the rake angle of said bit stack, and stops on said head mounting member and said tool holding head mutually engageable to position said tool holding head angularly on said head mounting member, at least one of said stops being adjustable to vary the angular position of said tool holding head member and the rake angle of said bit stack, said scale and indicator means and said stops being correlated so that a selected rake angle of said bit stack is designated directly by said scale and indicator means.

14. A cutting tool comprising, in combination, a tool bit having at least one flat locating surface thereon, an inclined cutting surface disposed on one end of said bit for engagement with a workpiece during a cutting operation, an inclined thrust surface on the other end of said tool bit and disposed parallel with respect to said inclined cutting surface, said bit having at least one opening formed therein and extending therethrough substantially at said thrust surface, a toolholder having a flat horizontal surface corresponding to said locating surface on the bit, and an inclined thrust resisting surface corresponding to said inclined thrust surface on the bit, cooperating dovetail means on said bit and tool holder adjacent said thrust and thrust resisting surfaces, respectively, insuring solid seating engagement between said surfaces, said tool holder having at least one opening formed therein and extending therethrough, said inclined thrust resisting surface and the flat surface of said toolholder cooperating with said inclined surface and the flat locating surface on the bit, respectively, in a manner to invariably maintain said cutting surface in a constant predetermined cutting position with respect to said workpiece regardless of the reduction in thickness of the bit during successive sharpening operations, a pressure block in engagement with said bit and releasably locked to said toolholder and having at least one threaded aperture formed therein, at least one threaded element extending through said openings and threaded into said aperture for releasably locking said pressure block to said toolholder in engagement with said bit for maintaining said bit locating and thrust surfaces in engagement with said thrust resisting and flat horizontal surfaces.

15. A cutting tool comprising, in combination, a tool bit having a flat locating surface thereon, an inclined cutting surface disposed on one end thereof for engaging a workpiece during a cutting operation, and an inclined thrust surface on the other end thereof disposed parallel to said inclined cutting surface; a toolholder having horizontal and inclined surfaces oriented similarly to and engaged by said locating surface and said inclined thrust surface respectively of the bit, cooperating dovetail means on said bit and tool holder adjacent said thrust and inclined surfaces, respectively, insuring solid seating engagement between said surfaces, said horizontal and inclined surfaces of said tool holder cooperating with the locating and thrust surfaces of the bit respectively to maintain said cutting surface invariably in a constant pre-determined cutting position with respect to said workpiece regardless of the reduction of thickness of the bit during successive sharpening operations; and a pressure block in engagement with said bit and fastened to said tool holder maintaining said bit locating and thrust surfaces solidly against the surfaces of said tool holder engaged thereby.

16. A cutting tool comprising in combination, a tool bit having a cutting edge, a flat top surface extending from said cutting edge, a pair of side surfaces, a bottom surface and a rear thrust surface; a tool holder having a fixed overlying surface seating the top surface of the bit to locate the latter vertically in said holder, a fixed side surface and a fixed back-up surface behind and seating the thrust surface of the bit to locate the latter horizontally in the tool holder; and means holding said bit clamped solidly against the overhanging and back-up surfaces of said tool holder to maintain the cutting edge of the bit invariably in a constant pre-determined cutting position with respect to a workpiece regardless of the reduction in thickness of the bit during successive sharpening operations, said means including a detachable adjustable wedge means on said tool holder having a surface parallel to and engaging one side surface of said bit to seat the other side surface thereof against the fixed side surface of said tool holder, and a detachable adjustable clamping means on said tool holder having a surface parallel to and engaging the bottom surface of said bit to seat said bit top surface against said holder overlying surface, said wedge and clamping means mutually cooperating to seat said bit rear thrust surface against said holder back-up surface.

17. A cutting tool for a machine of the type adapted to have a workpiece therein and having a tool holding part provided with a fixed locating surface therein, said tool comprising a tool bit having a cutting edge, a top locating surface extending from said cutting edge, and a rear thrust surface; a tool holder having a shank portion provided with a fixed reference surface and adapted to be received in the tool holding part of the machine with said reference surface clamped solidly against the locating surface of said tool holding part, said tool holder also having a bit holding portion provided with a locating surface overlying and seating solidly on the top surface of said bit and a back-up surface seating solidly on the thrust surface of the bit, cooperating dovetail means on said bit and tool holder adjacent said thrust and back-up surfaces, respectively, insuring solid seating between said surfaces, the overlying locating surface of said bit holding portion being in fixed pre-determined relationship to the reference surface of said shank portion to invariably maintain the cutting edge of said bit in constant predetermined cutting position with respect to work in said machine regardless of the reduction in thickness of the bit during successive sharpening operations; and means for holding said bit solidly against the overlying and back-up surfaces of said tool holder.

18. A cutting tool having a machine of the type adapted to hold a workpiece for rotation therein and having a slidable tool holding part provided with a fixed locating surface disposed precisely in alignment with the rotational axis of said workpiece, said tool comprising a tool bit having a cutting edge, a top surface extending from said cutting edge and a rear thrust surface; a tool holder having a shank portion provided with a fixed reference surface and adapted to be received in the tool holding part of the machine with said reference surface clamped solidly against the locating surface of said tool holding part, said tool holder also having a bit holding portion provided with an overlying locating surface disposed precisely in alignment with the reference surface of said shank portion and seating on the top surface of said bit and also provided with a back-up surface seating on the thrust surface of said bit, cooperating dovetail means on said bit and tool holder adjacent said thrust and back-up surfaces, respectively, insuring solid seating between said surfaces, the overlying locating surface of said bit holding portion holding the cutting edge of said bit precisely in alignment with the rotational axis of the work regardless of the reduction in thickness of the bit during successive sharpening operations, and the back-up surface of said bit holding portion holding said cutting edge a fixed pre-determined distance from said work for any slidably adjusted position of said tool holding part, and bit clamping means detachably fastened to the bit holding portion of said tool holder exerting a wedging action on said bit to hold the latter solidly against the overlying and back-up surfaces of said bit holding portion.

19. The invention as set forth in claim 18 wherein said bit holding portion has an arcuate external surface generated about the cutting edge of said bit as a center and said shank portion has an arcuate seat engaged by and complementing the external arcuate surface of said bit holding portions, and including means for holding said bit holding portion in a selected angularly adjusted position on said shank portion.

References Cited by the Examiner

UNITED STATES PATENTS

| | | | |
|---|---|---|---|
| 1,418,983 | 6/1922 | Smith | 29—102 |
| 1,721,129 | 7/1929 | Mehl | 29—102 X |
| 1,955,357 | 4/1934 | Christman | 29—97 |
| 2,346,084 | 4/1944 | Sanocki | 29—102 X |
| 2,458,244 | 1/1949 | Bohl | 29—98 |
| 2,521,868 | 12/1950 | Otto | 29—105 X |
| 2,908,963 | 10/1959 | Gollus | 29—96 |
| 2,949,662 | 8/1960 | Cook | 29—96 |
| 3,078,547 | 2/1963 | Sweet | 29—97 |
| 3,125,798 | 3/1964 | Stein | 29—98 |

FOREIGN PATENTS

| | | |
|---|---|---|
| 904,081 | 2/1945 | France. |
| 922,833 | 2/1947 | France. |
| 166,590 | 7/1921 | Great Britain. |

ANDREW R. JUHASZ, *Primary Examiner.*

WILLIAM W. DYER, JR., HARRISON L. HINSON,
*Examiners.*